United States Patent [19]

Dahm

[11] 4,217,530

[45] Aug. 12, 1980

[54] SYSTEM OR THE ACCURATE POSITIONING OF AN APPARATUS ALONG A PATH OF MOVEMENT BY MEANS OF A DIGITAL POSITION READER UNIT

[76] Inventor: Jan Dahm, Vågslia 24, Tertnes, Norway

[21] Appl. No.: 790,972

[22] Filed: Apr. 26, 1977

[30] Foreign Application Priority Data

Apr. 27, 1977 [NO] Norway .................................. 761437

[51] Int. Cl.² ................................................ G05B 5/01
[52] U.S. Cl. .................................... 318/623; 318/640; 250/561; 414/279
[58] Field of Search ............... 318/614, 623, 640, 466, 318/467, 480; 214/16.4 A, 38 BB; 356/172; 250/561; 414/266, 270, 273, 279, 280–282

[56] References Cited

U.S. PATENT DOCUMENTS

| 3,164,763 | 1/1965 | Kelley ................................ 318/623 |
| 3,572,484 | 3/1971 | Richins ........................... 214/16.4 A |
| 3,586,950 | 1/1971 | Prodel ................................ 318/640 |
| 3,596,789 | 8/1971 | Aaronson et al. ............... 214/16.4 A |
| 3,699,421 | 10/1972 | Stempler et al. ................... 318/640 |
| 3,737,056 | 6/1973 | Hathcock, Jr. ................. 214/16.4 A |
| 3,786,929 | 1/1974 | Hathcock, Jr. ................. 214/16.4 A |
| 3,815,084 | 6/1974 | Pease .............................. 214/16.4 A |

FOREIGN PATENT DOCUMENTS 2208011 9/1972 Fed. Rep. of Germany ..... 214/16.4 R

Primary Examiner—J. V. Truhe
Assistant Examiner—Eugene S. Indyk

[57] ABSTRACT

System for accurately positioning an article transfer assembly in a preselected one of several positions in at least one of a horizontal and a vertical path of movement by remotely controlling the assembly by way of a digital position reader unit. A belt control arrangement extends parallel to the paths of movement of the assembly and is provided with a series of mutually separate and locally disposed position-defining control elements, a corresponding series of mutually separate and locally disposed position-indicating control elements as well as a corresponding series of mutually separate and locally disposed locking elements. A carrier arrangement is combined with the assembly and displaceably engages the control arrangement by way of rollers. The carrier arrangement is provided with search devices adapted to cooperate with the position-defining control elements and with the position-indicating control elements and with a locking device adapted to cooperate with the locking elements. Stopping and starting of the assembly is controlled remotely by way of the digital position reader unit on cooperatingly controlling the control elements and the search devices relative to each other and the locking device relative to the locking elements.

4 Claims, 6 Drawing Figures

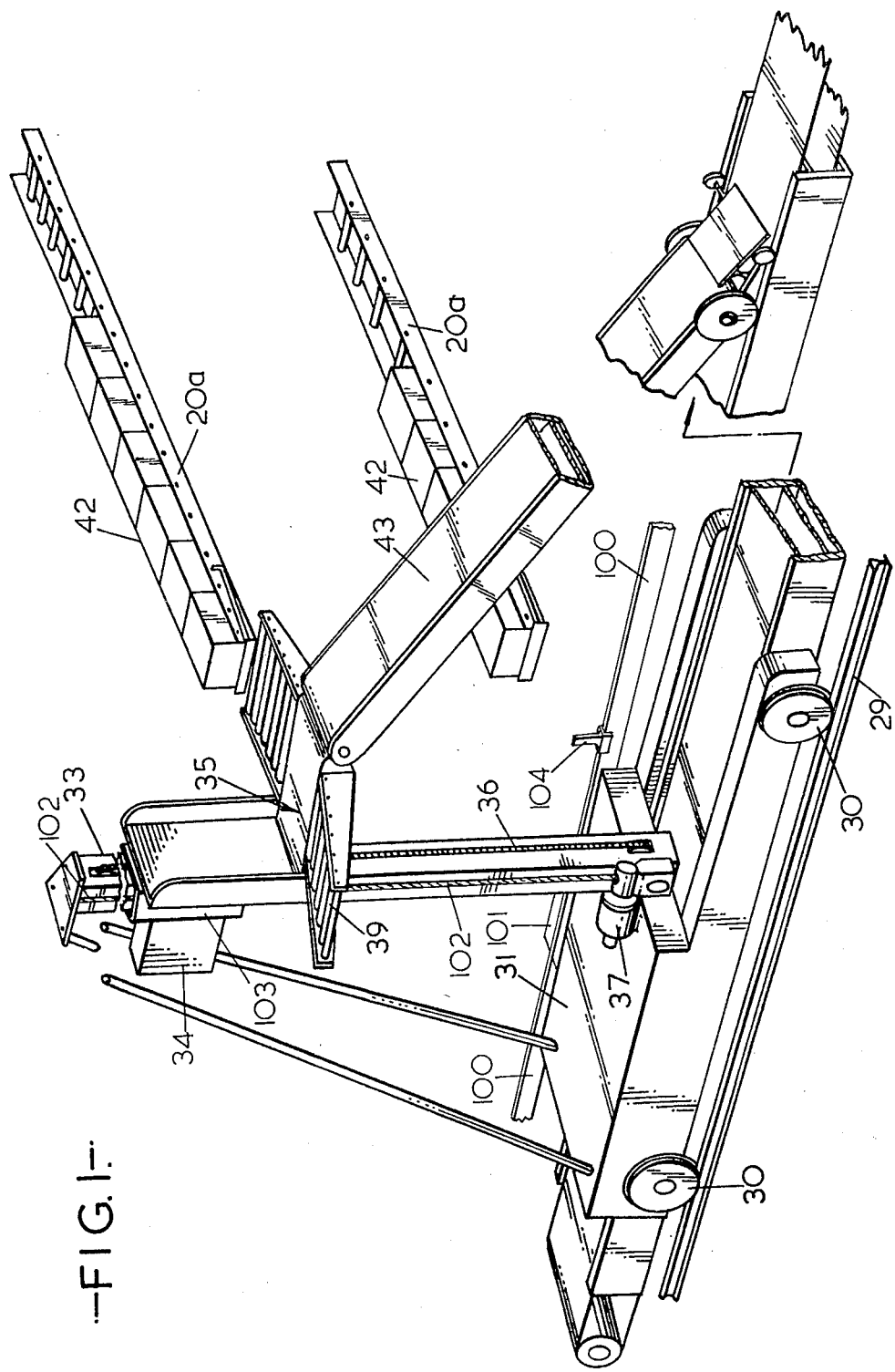

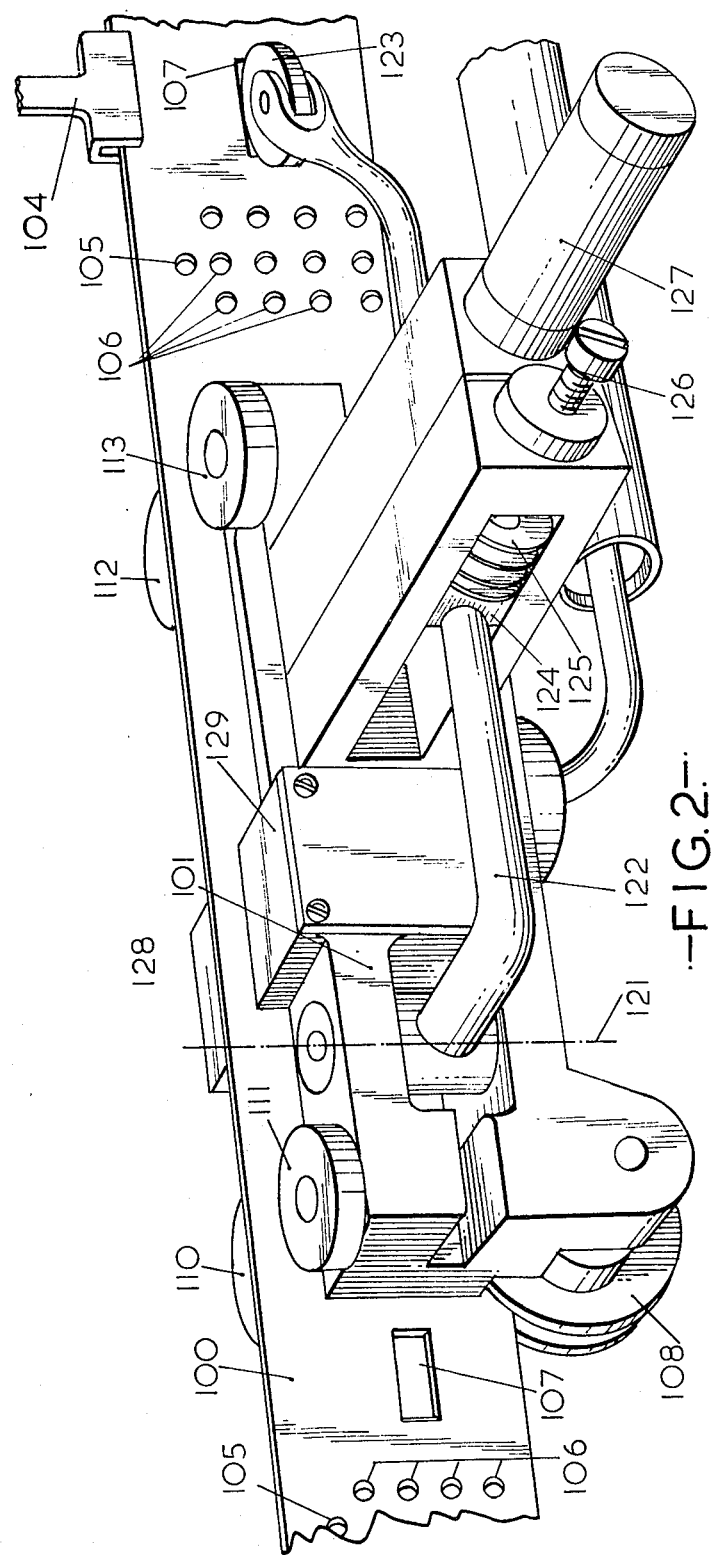

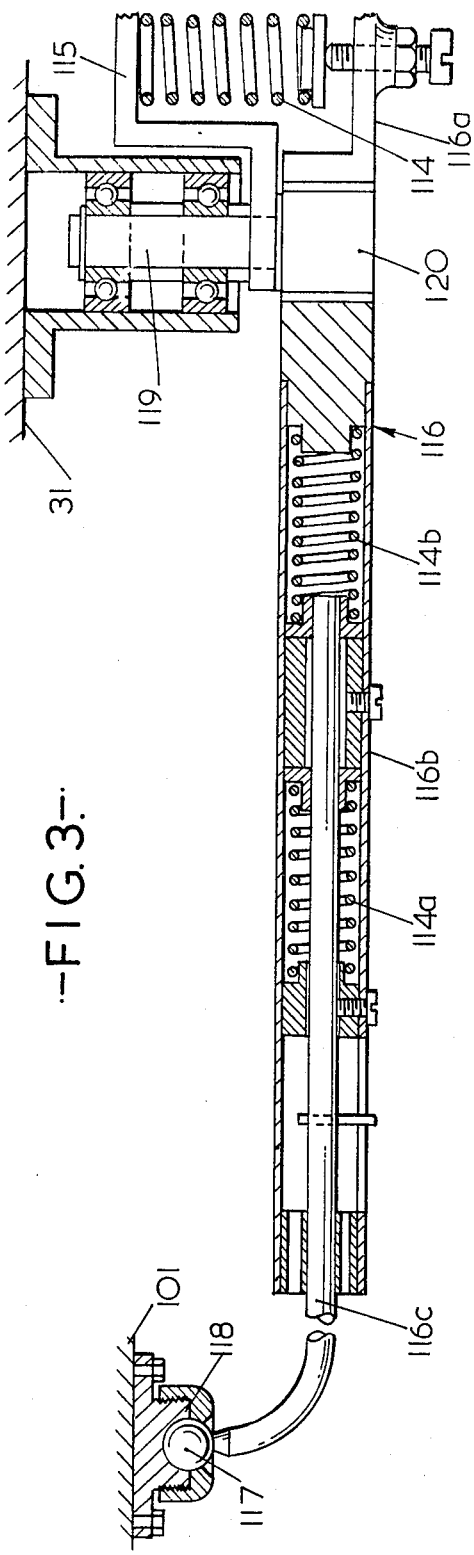

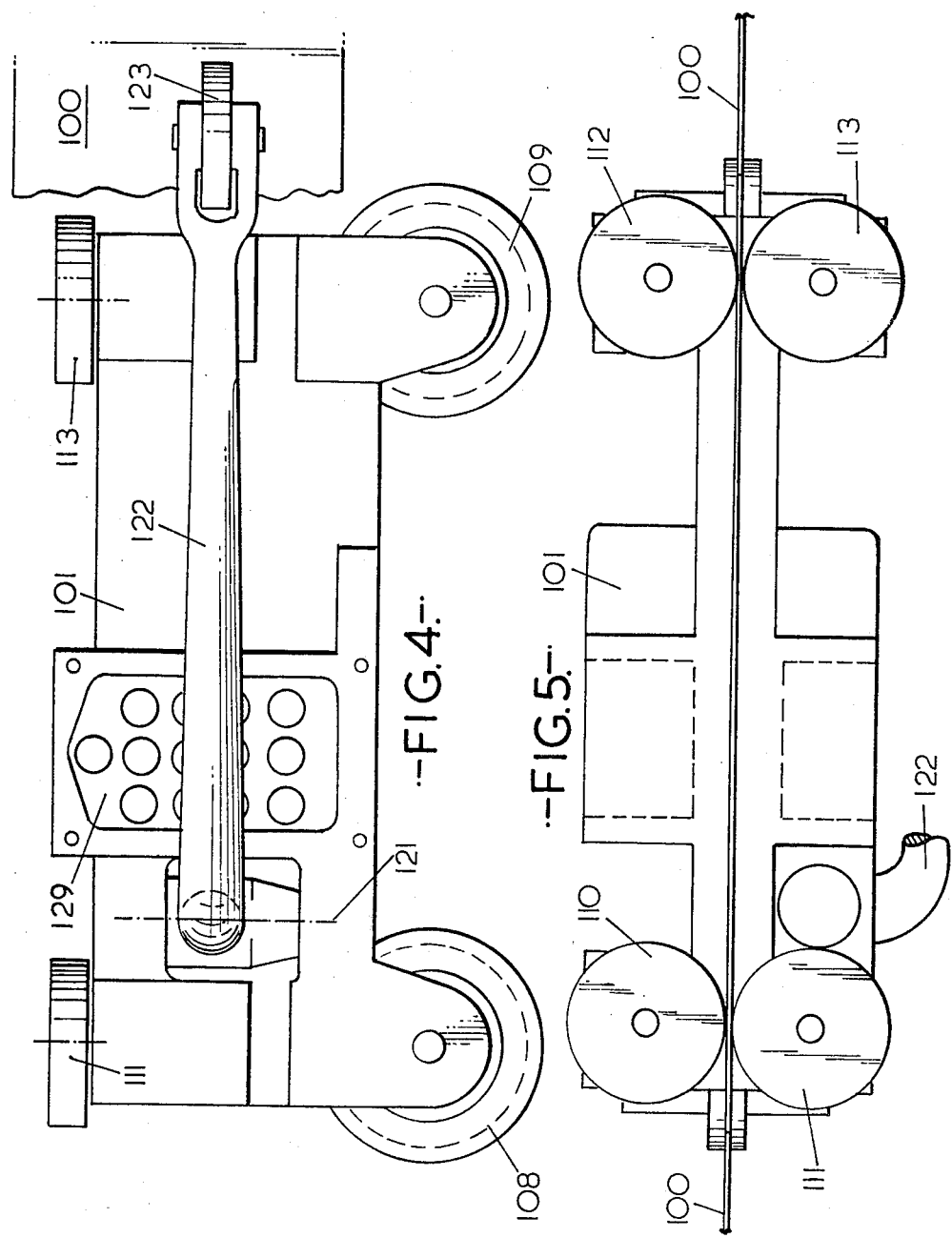

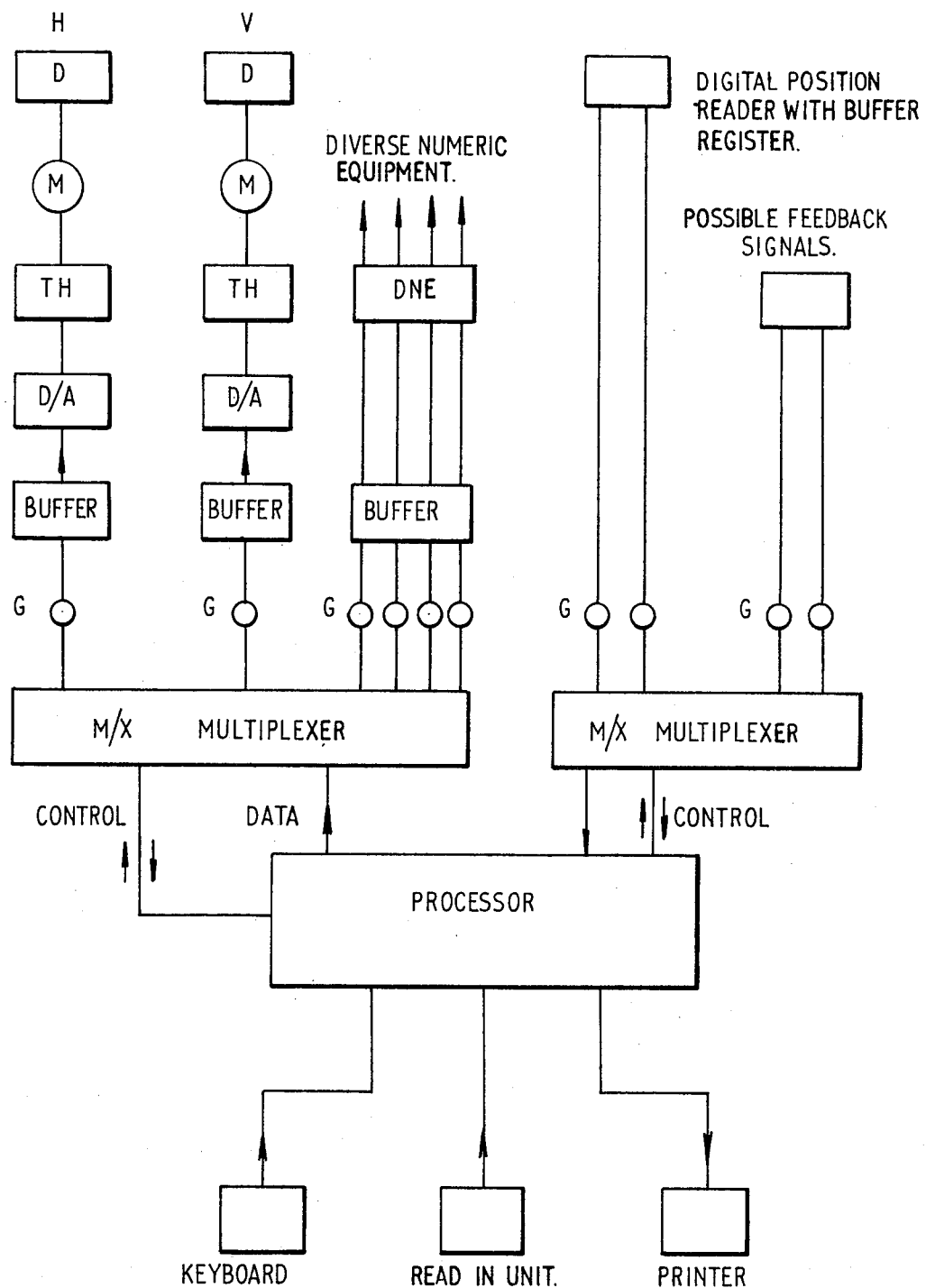
-FIG. 6-

4,217,530

SYSTEM OR THE ACCURATE POSITIONING OF AN APPARATUS ALONG A PATH OF MOVEMENT BY MEANS OF A DIGITAL POSITION READER UNIT

BACKGROUND OF INVENTION

FIELD OF INVENTION

This invention relates to a system for the accurate positioning of an apparatus in a preselected one of several possible positions in a horizontal and/or vertical path of movement by remote control of the apparatus via a digital position reader unit.

The aim is a positioning system which has general application for positioning an apparatus along arbitrary movement paths, but preferably rectilinear and uniform or uniformly curved paths of movement and particularly vertical and horizontal movement paths.

SUMMARY OF INVENTION

The invention is particularly directed to a positioning system which is to be used in connection with retrieving articles from a rack, in which an article transfer assembly or article-retrieving apparatus is moveable horizontally and vertically to various positions in front of the article rack for withdrawing articles from different supply tracks of the rack as required.

The aim is to be able to control the article transfer assembly or article-retrieving apparatus rapidly and accurately to the various desired positions along outlets of the vertical or horizontal rows of article supply tracks of the rack, by remote control via a digital position reader unit.

Accordingly the present invention resides in a system for accurately positioning an article transfer assembly in a preselected one of several possible positions in at least one of a horizontal and a vertical path of movement by remotely controlling said assembly via a digital position reader unit, said system comprising (a) belt control means extending parallel to said paths of movement of said assembly and provided with a series of mutually separate and locally disposed position-defining control elements, a corresponding series of mutually separate and locally disposed position-indicating control elements and a corresponding series of mutually separate and locally disposed locking elements;

(b) carrier means combined with said assembly and displaceably engaging said control means by means of guide means, said carrier means being provided with search means adapted to cooperate with said position-defining control elements and with said position-indicating control elements and locking means adapted to cooperate with said locking elements; stopping and starting of said assembly being controlled by remote control via said digital position reader unit on cooperatingly controlling said control elements and said search means relative to each other and said locking means relative to said locking elements.

By means of the system the objective is to achieve an accurate guidance of the carrier means relative to the control means and a momentary stopping of the carrier means relative to the control means. This is ensured, for one thing, by connecting the carrier means to the article transfer assembly in an elastically yielding fashion.

It is preferred that the carrier means be rockingly mounted relative to the assembly and connected to the assembly via a double-acting spring connection which permits a limited movement of the carrier means relative to the assembly in a direction opposite the direction of movement of the assembly.

BRIEF DESCRIPTION OF THE DRAWINGS

In order that the invention can be more clearly understood, a convenient embodiment thereof will now be described, by way of example, with reference to the accompanying drawings in which:

FIG. 1 is a perspective view of an article storage and handling system for perceiving a field of application for the system according to the invention, FIG. 2 is a perspective view of the carrier means of an article transfer assembly together with a part of the control means, FIG. 3 is a section of a support arm which connects the carrier means to the assembly, FIG. 4 is a side view of the carrier means, FIG. 5 is a vertical projection of the carrier means, and FIG. 6 is a diagram of the remote control side of the system.

Referring to FIG. 1, there is shown an article storage and handling system which includes an article transfer assembly for the retrieval of articles 42 from supply tracks 20a in an article rack, where for the sake of simplicity there are illustrated only two of a large number of supply tracks which are arranged relatively tightly together in horizontal and vertical rows. The article transfer assembly comprises a carriage 31 which, with the aid of wheels 30, rolls on horizontal rails 29 and further comprises an article-retrieving means which is vertically displaceable on a column 33 on the carriage 31. The carriage 31 and the article-retrieving means 35 are driven separately by means of their respective electromotors. In the drawing, there is only shown motor 37 for article-retrieving means 35, the drive motor for the carriage being shieldably received in the carriage itself. The particular construction of the article-retrieving means is described further and illustrated in Norwegian Pat. Application No. 761,276 and will not be described in further detail here.

In FIG. 1, there is illustrated a first control means 100 for controlling horizontal movements of the assembly via the carriage 31. A carriage means 101 is secured to the carriage 31. In a corresponding manner, a vertically extending belt on the column 33 forms a second control means 102 for controlling vertical movements of the article-retrieving means 35 relative to the carriage 31. A carrier means 103 is incorporated in a head 34 secured to the article-retrieving means 35.

The movement of the carriage 31 along the rails 29 is controlled by a first system according to the invention, while the movement of the article-retrieving system 35 along the column 33 on the carriage 31 is controlled by a second system according to the invention. These two systems can be designed in a corresponding manner so that only the one system will be described in detail herein. However, it is apparent that the two systems can employ, in practice and as required, somewhat different components, the degree of accuracy for positioning of the article-retrieving means 35 relative to the carriage 31 being in practice able to be greater than the degree of accuracy for positioning of the carriage 31 relative to the rails 29. On the other hand, the path of movement of the carriage 31 and also its speed of movement can be greater than the path of movement and speed of movement of the article-retrieving means 35.

In FIG. 2, there is shown the first control means 100 in the form of a tempered steel belt which with suitable intermediate space is suspended from downwardly hanging support lugs 104. The control means is extended in the longitudinal direction by means of stays (not shown) or similar tension means secured at the ends of the control means. With uniform intermediate spaces, for example corresponding to the partition distance between the supply tracks of a horizontal row of article supply tracks 20a in an article rack or, if desired, with significantly shorter distances, there is designed in the control means 100, a position-defining control element 105 and a set of digital position-indicating control elements 106. The control elements 105 and 106 in the illustrated embodiment are collected in a concentrated group and each have the form of a circular hole which is bored directly into the control means. With equivalent intermediate spaces, there are designed at a certain distance from the control elements 105,106, locking elements 107 in the control means. The locking elements 107 have the form of rectangular holes with obliquely chamfered, opposite end faces which converge inwardly in to the control means at an angle of 90°.

The carrier means 101 which is secured to the carriage 31 in a manner which will be described in further detail below, is provided with a first pair of groove-carrying guide wheels 108,109 which engage with lower edge portions of the control means and is further provided with a second and third pair of cylindrical guide wheels 110,111 and 112,113 which engage with opposite edge portions of the control means with each wheel on its opposite side of the control means. In this way, it is ensured that the carrier means 101 can be guided into exact engagement with the control means 100. In order to ensure that the carrier means is held in intentional accurate engagement with lower edges of the control means, the carrier means is urged vertically upwards against the control means by means of a compression spring 114 (see FIG. 3) which is fixed between a lug 115 on the carriage 31 and the end of the one branch 116a of a two-branched support arm 116. The other branch 116b,116c of the support arm 116 is connected at the opposite end to the carrier means 101 via a ball head 117 which is rotatably mounted in a bearing 118 secured to the under side of the carrier means. The branch of the support arm which supports the ball head 117 is provided with a telescopically displaceable arm mechanism 116b,116c which includes two counteracting compression springs 114a,114b which ensure that the arm 116 assumes a mean pushed-together condition, as shown in FIG. 3, but which permit the arm to be lengthened or shortened to a certain defined length, for example to an order of magnitude of a few centimeters. The arm 116 is pivotably mounted about a vertical shaft pin 119 on the carriage 31 and about a horizontal shaft pin 120, the axes of which cross each other in the central axis of the arm 116.

In the carrier means 101 (see FIG. 2), there is pivotably mounted, about a vertical pivotal axis 121, a locking arm 122 having a locking means 123 in the form of a cylindrical locking wheel which is rotatably mounted at the outer end of the arm 122. About the centre of the arm 112, this is actuated in a direction inwardly towards the control means 1101 by a shoe 124 which is pressure-loaded by a compression spring 125. The compression spring is regulatably adjustable by means of an adjustment screw 126. Further the arm is connected to a piston rod in a pneumatic cylinder 127 which is adapted on activation to draw the arm 122 in a direction away from the control means 100 against the force of the spring 125 or to release the arm 122 so that by means of the spring 125 it can be swung inwardly towards the control means 100.

On the one side of the control means 100, there is secured to the carrier means 101 a group of light sources 128 in the form of light-emitting diodes of the "Calcium Arsenide Light Emitting Diode CQY 11B" type, which have a lifetime of 20 years before halving the light efficiency. On the opposite side of the control means 100, there is secured to the carrier means 101 a corresponding number of photo-transistors 129 of the "Phillips BPx 72 Photo-Transistor" type. In the illustrated embodiment, there is employed, in all, thirteen photocells with a corresponding thirteen holes 105,106 bored in the control means 100. A first hole which is arranged uppermost in the drawing forms the position-defining signal control element 105 which gives signals for reading off the remaining 3×4 holes which form the digital position-indicating control elements 106.

By means of control pulses which are transmitted from a remotely disposed electronic central station (FIG. 6), one can start and stop the electromotors for the carriage 31 and the article-retrieving means 35 in the usual manner. The stopping of the movement of the carriage and the article-retrieving means is controlled via the control means 100 and the photocell equipment 129, which corresponds to a digital position reader unit (DPRU) of FIG. 6, on the carrier means 101 on the carriage 31 or via the control means 102 and the photocell equipment on the carrier means 103 on the article-retrieving means 35.

When the carrier means is displaced along the control means, a control pulse for stopping of the carriage or the article-retrieving means can only be transmitted in the short time interval a photocell of the photocell equipment 129 on the carrier means finds itself directly opposite a control element 105. At the same time the pneumatic cylinder can be actuated so that the locking means is led momentarily into abutment with the control means. Each position along rails 29 of the carriage 31 and along column 33 of the article-retrieving means is governed by a selected system of screened and unscreened holes 106 (for the sake of simplicity only unscreened holes are shown in the drawing). By employing twelve different holes 106 there are $2^{12}-1$ possibilities, that is to say the possibility for 4095 different position indications in the path of movement of the carriage. As regards positions of the article-retrieving means, one can manage with a far smaller number of different positions and, in practice, it is sufficient for several purposes to have only eight holes 106, something which correspondingly gives $2^8-1$ possibilities, that is to say the possibility for 255 different position indications in the path of movement of the article-retrieving means relative to the carriage.

For the carriage, there can be employed a speed of movement of, for example, 20 mm/sec. and provision can be made for the locking wheel 123 to be led into supporting abutment against, that is to say in a search position on, the control means 100 just before stopping the carriage, for example so that the locking wheel 123 rolls 10–20 mm on the control means and thereafter is urged into the locking groove (locking element) 107. As a consequence of the obliquely chamfered end edges of the locking groove 107, one effectively ensures positioning of the locking wheel 123 in the locking groove with abutment against two end edge surfaces in a 90° keyed engagement so that the carrier means can be locked effectively against displacement in both directions of movement. However, in circumstances where there is a need for it, the locking wheel 123 can be allowed to roll upwardly from the locking groove against a certain spring force which is regulated via the adjustment screw 126.

When the locking wheel 123 is led into locking engagement with the locking groove 107, the carrier means 101 is secured in a desired position relative to the control means 100 so that the photocell equipment 129 is in the "read" position. Even if the electrical drive current to the system should be broken or disconnected for one or the other reason, the locking wheel will be held pressed into the locking position and will ensure that immediately the drive current is applied again to the system, the associated park position for the apparatus will be able to be "read off" in the system. It is consequently arbitrary in which position the apparatus is parked at the termination of a working operation and immediately a new working operation is to be set in motion, the parking position can be "read off" and starting from this the assembly controlled in the correct direction to a new position.

If the carriage is to be moved from a predetermined parking position, for example, 50 positions further in a particular direction, a control pulse is given in the parking position via the control element 105 to the pneumatic cylinder 127 of the carrier means 101 so that the locking wheel 123 is raised out of the locking groove 107 and is disposed at a certain distance, for example 0.5 mm, outside the control means 100. At the same time, there is given a control pulse by way of the control element 105 for starting the drive motor and operating the carriage in the decided direction. As the control system of the carriage passes the 49 position, it is given, via the control element 105 of the 49 position, a control pulse to stop the drive motor of the carriage at the same time as the control wheel 123 is given, via the pressure cylinder 127, a control pulse so that the control wheel is led into abutment with the control means in an intended search position. As the carriage moves further in the path of movement to the 50 position, the locking wheel 123 is forced by the spring 125 into place in the locking groove 107 and ensures, with a certain compression spring force, the location of the carriage in the desired 50 position, that is to say in the position which can then be "read off" as the 50 position relative to the said arbitrary parking position. Even if the carriage 31, as a consequence of the effect of the force of gravity, moves a distance further beyond the 50 position, while the carrier means 101 is now fixed in the predetermined position relative to the control means 100, the spring system 114a,114b in the connecting arm between the carrier means and the carriage can provide an an elastic dampening of the movement of the carriage and ensure that the carriage gradually assumes the desired position.

In FIG. 6, there is shown uppermost to the left the drive side of the horizontal H and the vertical V portion of the system. There are shown the drive units D, namely carriages 31 (HD) and 103 (VD) with their associated equipment such as gear box, brake and chain, each of which is driven by its respective motor M via a thyristor control TH. A digital to analog converter D/A gives signals to the thyristor control. Between a buffer and a first multiplexer, there is arranged a galvanic partition G. Furthermore, diverse numerical equipment DNU is connected to the multiplexer via a buffer and galvanic partitions. The multiplexer is connected to a processor via a data transfer line and a control line.

The digital position reader unit (DPRU) corresponding to the photocell equipment 129 of FIG. 2 is connected with buffer register to a second multiplexer via connecting lines to each respective galvanic partition. A reader for possible feedback signals is connected to the multiplexer via connecting lines to each respective galvanic partition. The second multiplexer is connected via a data transfer line and a control line to the said processor.

The processor is provided with connecting lines to a keyboard, a read-in unit and a printer respectively.

I claim:

1. In a system for accurately positioning an article transfer assembly in a preselected one of several possible positions in at least one of a vertical and horizontal path of movement by remotely controlling said assembly via a digital position reader unit, the improvement which comprises
   (a) belt control means extending parallel to said paths of movement of said assembly and provided with a series of mutually separate and locally disposed position-defining control elements, a corresponding series of mutually separate and locally disposed position-indicating control elements and a corresponding series of mutually separate and locally disposed locking elements; and
   (b) carrier means combined with said assembly via an elastically yielding connection and displaceably engaging said control means by means of guide means, said carrier means being provided with search means adapted to cooperate with said position-defining control elements and with said position-indicating control elements and locking means adapted to cooperate with said locking elements; stopping and starting of said assembly being controlled by remote control via said digital position reader unit on cooperatingly controlling said control elements and said search means relative to each other and said locking means relative to said locking elements.

2. In a system for accurately positioning an article transfer assembly in a preselected one of several possible positions in at least one of a vertical and a horizontal path of movement by remotely controlling said assembly via a digital position reader unit, the improvement which comprises
   (a) belt control means extending parallel to said paths of movement of said assembly and provided with a series of mutually separate and locally disposed position-defining control elements, a corresponding series of mutually separate and locally disposed position-indicating control elements and a corresponding series of mutually separate and locally disposed locking elements; and
   (b) carrier means combined with said assembly and displaceably engaging said control means by means of guide means, said carrier means being rockably mounted relative to said assembly and connected to said assembly via a double-acting spring connection which permits a limited movement of said carrier means relative to said assembly in a direction opposite to the direction of movement of said assembly and said carrier means being provided with search means adapted to cooperate with said position-defining control elements and with said position-indicating control elements and locking means adapted to cooperate with said locking elements; stopping and starting of said assembly being controlled by remote control via said digital position reader unit on cooperatingly controlling said control elements and said search means relative to each other and said locking means relative to said locking elements.

3. In a system for accurately positioning an article transfer assembly in a preselected one of several possible positions in at least one of a vertical and a horizontal path of movement by remotely controlling said assembly via a digital position reader unit, the improvement which comprises
  (a) belt control means extending parallel to said paths of movement of said assembly and provided with a series of mutually separate and locally disposed position-defining control elements, a corresponding series of mutually separate and locally disposed position-indicating control elements and a corresponding series of mutually separate and locally disposed locking elements; and
  (b) carrier means combined with said assembly and displaceably engaging said control means by means of guide means, said carrier means being rockably mounted relative to said assembly and connected to said assembly by means of a telescopic mechanism spring-loaded in opposite directions permitting a limited movement of said carrier means relative to said assembly in a direction opposite to the direction of movement of said assembly and connected to said carrier means and to said assembly via a joint connection and said carrier means being provided with search means adapted to cooperate with said position-defining control elements and said position-indicating control elements and locking means adapted to cooperate with said locking elements; stopping and starting of said assembly being controlled by remote control via said digital position reader unit on cooperatingly controlling said control elements and said search means relative to each other and said locking means relative to said locking elements.

4. In a system for accurately positioning an article transfer assembly in a preselected one of several possible positions in at least one of a vertical and a horizontal path of movement by remotely controlling said assembly via a digital position reader unit, the improvement which comprises
  (a) belt control means extending parallel to said paths of movement of said assembly and provided with a series of mutually separate and locally disposed position-defining control elements, a corresponding series of mutually separate and locally disposed position-indicating control elements and a corresponding series of mutually separate and locally disposed locking elements; and
  (b) carrier means combined with said assembly and displaceably engaging said control means by means of guide means, said carrier means being provided with search means adapted to cooperate with said position-defining control elements and with said position-indicating control elements and locking means adapted to cooperate with said locking elements; said control means consisting of tightly tensioned steel belting provided with through-holes which are formed in precisely predetermined positions on the control means and respectively form the control elements and the locking elements, and the carrier means consisting of a carriage which by means of control wheels accurately and guidingly engages the control means, the control means being provided with search means and locking means at correspondingly predetermined mutual distances in the carrier means; stopping and starting of said assembly being controlled by remote control via said digital position reader unit on cooperatingly controlling said control elements and said search means relative to each other and said locking means relative to said locking elements.

* * * * *